United States Patent

[11] 3,534,778

| [72] | Inventor | Joseph W. Goecke |
| --- | --- | --- |
| | | Northglenn, Colorado |
| [21] | Appl. No. | 808,139 |
| [22] | Filed | March 18, 1969 |
| [45] | Patented | Oct. 20, 1970 |
| [73] | Assignee | The Gates Rubber Company |
| | | Denver, Colorado |
| | | a corporation of Colorado |

[54] FLEXIBLE CONDUIT
6 Claims, 3 Drawing Figs.

[52] U.S. Cl. ........................................................ 138/122, 138/174
[51] Int. Cl. ........................................................ F16l 11/08
[50] Field of Search ............................................ 138/119, 122, 129, 132, 133, 174

[56] References Cited
UNITED STATES PATENTS
3,047,026  7/1962  Kahn ............................ 138/122
FOREIGN PATENTS
681,362  3/1961  Canada ........................ 138/122

Primary Examiner—Laverne D. Geiger
Assistant Examiner—R. J. Sher
Attorney—Raymond Fink ABSTRACT: A spirally reinforced, flexible conduit or hose having a substantially smooth inner bore as opposed to a convoluted inner bore; said conduit capable of being flexed to a bend radius of one diameter or less without collapsing.

Patented Oct. 20, 1970

INVENTOR.
JOSEPH W. GOECKE
BY Raymond Fink

ATTORNEY

FLEXIBLE CONDUIT

BACKGROUND OF THE INVENTION

This invention relates to spirally reinforced, flexible conduit but more particularly this invention relates to reinforced conduit which is extremely flexible even in large diameters.

Typically, conduits or hose requiring strength plus flexibility have a convoluted shape and an embedded spiral reinforcement member. The spiral reinforcement member gives burst and collapse resistant strength to the hose while the convolutions provide preformed folds to enhance flexibility. A problem associated with preformed convoluted hose is the inner convolutions may initiate turbulence to material handled by the hose. Excessive turbulence may take its toll in terms of excessive inner wall wear at the protruding convolutions and loss of flow efficiency.

SUMMARY

It is an object of my invention to provide a flexible conduit having a spiral reinforcement and a substantially smooth inner bore.

Another object of my invention is to provide a conduit capable of being flexed to a one-diameter bend radius or less without collapsing.

A preferred embodiment of the improved conduit is fabricated using typical wrapped hose-forming techniques. The conduit has a substantially constant inner diameter and a substantially constant wall thickness except for at least one helical groove formed in the outside wall. On both sides of the groove and disposed within the conduit wall are two spiral reinforcement members. The reinforcement may be wire, molded resin or other high modulus material. The two members give collapse resistance and burst strength to the conduit while also providing a foundation for controlled flexing. The longitudinal spacing between each of a pair of spiral reinforcements varies within a tolerance band according to the diameter of the conduit. The groove spacing and location of the spiral reinforcements are most important since they are the paramount factors in controlling folding of the conduit wall in an outwardly manner. When the conduit is flexed, the groove collapses and the wall section folds outwardly, temporarily forming a pseudo convolution. Controlled folding of the wall section in an outwardly manner permits even large diameter conduit to be flexed to a bend radius of less than one diameter. Materials passed through the hose are subjected to a minimum of flow-disturbing surfaces because the conduit maintains a substantially constant inside diameter when it is flexed.

Other advantages of this invention will become apparent upon review of the drawings and descriptions thereof.

TECHNICAL DISCLOSURE

Figure 1:
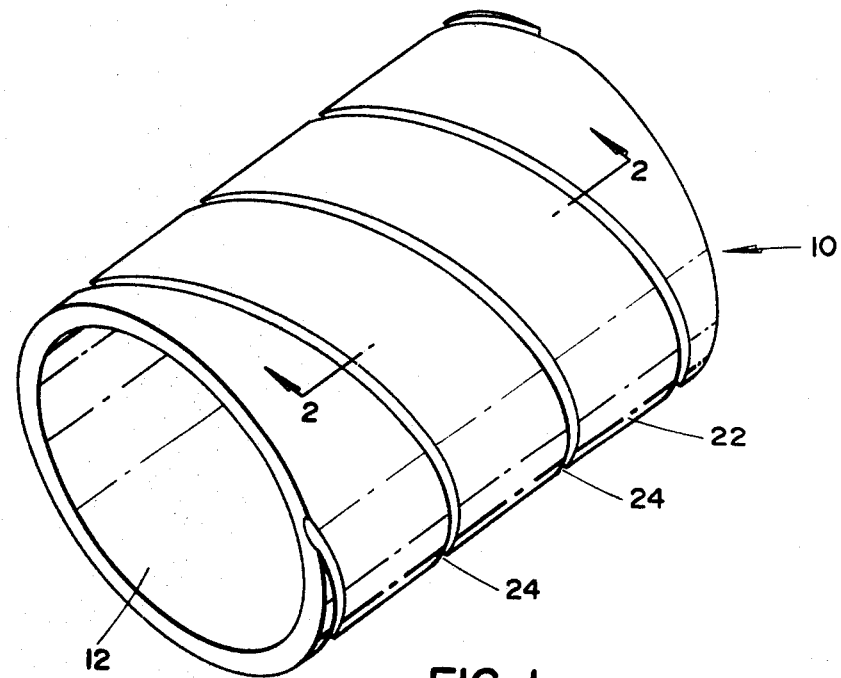
FIG. 1 is a perspective view showing a conduit embodying this invention.
Figure 2:
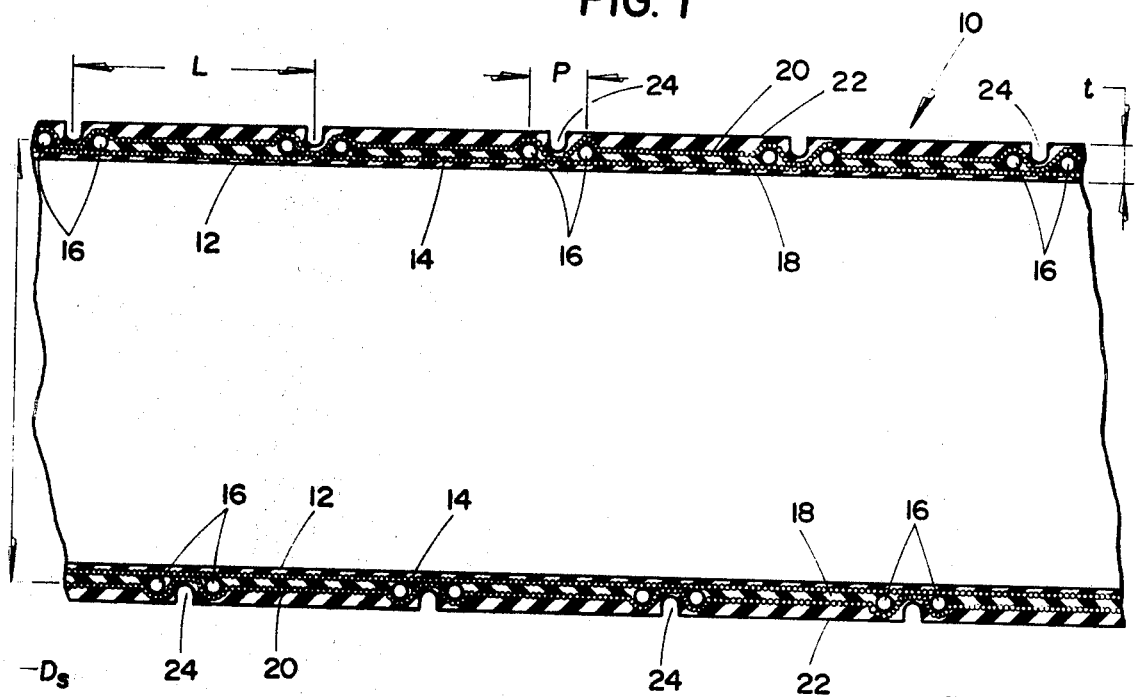
FIG. 2 is an axial cross-sectional view taken along the line 2–2 of FIG. 1 and showing the conduit wall sections somewhat exaggerated for clarity.

A preferred embodiment of my invention may best be illustrated by the construction of a wrapped rubber hose, keeping in mind that other materials and methods may be used to construct a hose embodying my invention without departing from the scope of this disclosure. For example, the wall section or main body of the conduit, which defines a tube, may be any suitable elastomeric such as natural rubber, styrenebutadiene rubber, butyl rubber, chloroprene, acrylonitrile, polyurethane, EPDM, polyvinylchloride, polyvinylchloride-polyvinylacetate copolymer, etc.; and the elastomeric may be strengthened with one or more layers of any suitable woven, knitted, braided, etc., material. As those skilled in the art readily know, the wall or main body of the tube may be selectively changed to enhance or reduce bending resistance by varying the conduit wall modulus; and the elastomeric may be selectively chosen to be compatible with the substance conveyed by the conduit. Throughout the drawings, the number "10" refers to a length of flexible hose embodying my invention. Referring to FIGS. 1 and 2, a hose embodying my invention is preferably fabricated on a mandrel of suitable length and diameter. The mandrel is adapted for rotation in a lathe, not shown. The lathe has suitable means for feeding continuous lengths of wires or other material at fixed axial distances along the mandrel. Hose construction is started by applying a strip of rubber material around the mandrel thereby forming a tube 12. The rubber tube stock may be selectively varied to be compatible with the material which is to be conveyed through the hose. One ply of multiunit cord fabric 14, impregnated with a rubber, is placed over the tube. Preferably, the cord fabric is bias cut so the cords form a 45° helix around the tube. The helix angle may be varied from 45° but it has been found that a helix angle of substantially 45° results in suitable hose flexibility. Next, at least one pair 16 of wire reinforcements is spiraled over the cord fabric. The longitudinal spacing L of the spiral is greater than the spacing P between the wires constituting a pair 16. Longitudinal spacing L between pairs 16 of wires is of primary importance. In general, larger diameter hoses require a greater longitudinal spacing L than smaller diameter hoses. However, a series of hoses of varying diameter may have the identical longitudinal spacing. For example, a longitudinal spacing L of 3 inches between wire pairs has been found to be satisfactory for hoses of 8, 10 and 12-inch spiral diameters, $D_s$. As can be seen, spiral diameter, $D_s$, can be defined as the diameter of a tube outlined by the spiral reinforcements. In comparison, longitudinal spacings L of 1¼ inches and 3½ inches between wire pairs are satisfactory for hoses of 2 and 16-inch diameters respectively. Spacing P between individual wires constituting a pair must be less than the longitudinal spacing between pairs to ensure outward folding of the hose wall. For example, a three-fourth-inch spacing P between wires of a pair is satisfactory for hoses of 8, 10, 12, 14 and 16-inch diameters whereas a one-fourth-inch spacing is satisfactory for hose of 2, 3 and 4-inch diameters.

More than one pair 16 of wire reinforcements may be used provided that the longitudinal spacing L between pairs is correct. A 12-inch diameter hose may be satisfactorily reinforced with two pairs of wires having a longitudinal spacing L of 3-inches between pairs. It has been found that a longitudinal spacing L substantially between .6 and 1.1 of the square root of the spiral diameter, $D_s$, results in a hose having satisfactory flexibility. The preferred reinforcement longitudinal spacing is approximately .9 of the square root of the spiral diameter.

Next, a rubber stock 18 is spiraled over the wire reinforcements, and then, a second layer 20 of multiunit cord fabric is applied. The second layer 20 of fabric is applied with its composite cords or grid forming an opposite helix from the first layer of cord fabric. A rubber cover 22 is then applied over the composite structure to increase the abrasion resistance of the hose. Of course, it is known by those skilled in the art that hose having no cord fabric reinforcement or having greater than two plys of fabric reinforcement can also be made.

The hose is prepared for curing by first spiraling a cord or rope or similar article, not shown, between wires constituting a pair and thereby forming a helical groove 24 on the outer surface of the hose wall. Care must be taken in applying the rope as too much tension during spiraling may cause the rope to become too deeply embedded in the hose wall. Nylon curing tape is then wrapped over the entire assembly and the hose is cured using typical vulcanization techniques. The conduit materials laminated during hose fabrication are fused together and thereby define an elastomeric tube having a reinforcement matrix. The thickness $t$ of the matrix may be varied and tailored to fit a chosen service application. For instance, a .23 wall thickness $t$ is satisfactory for a 12-inch diameter hose adapted for debris handling. After curing, the final step in the hose construction process is the removal of the nylon tape, the rope and the mandrel to expose the hose 10.

Figure 3:
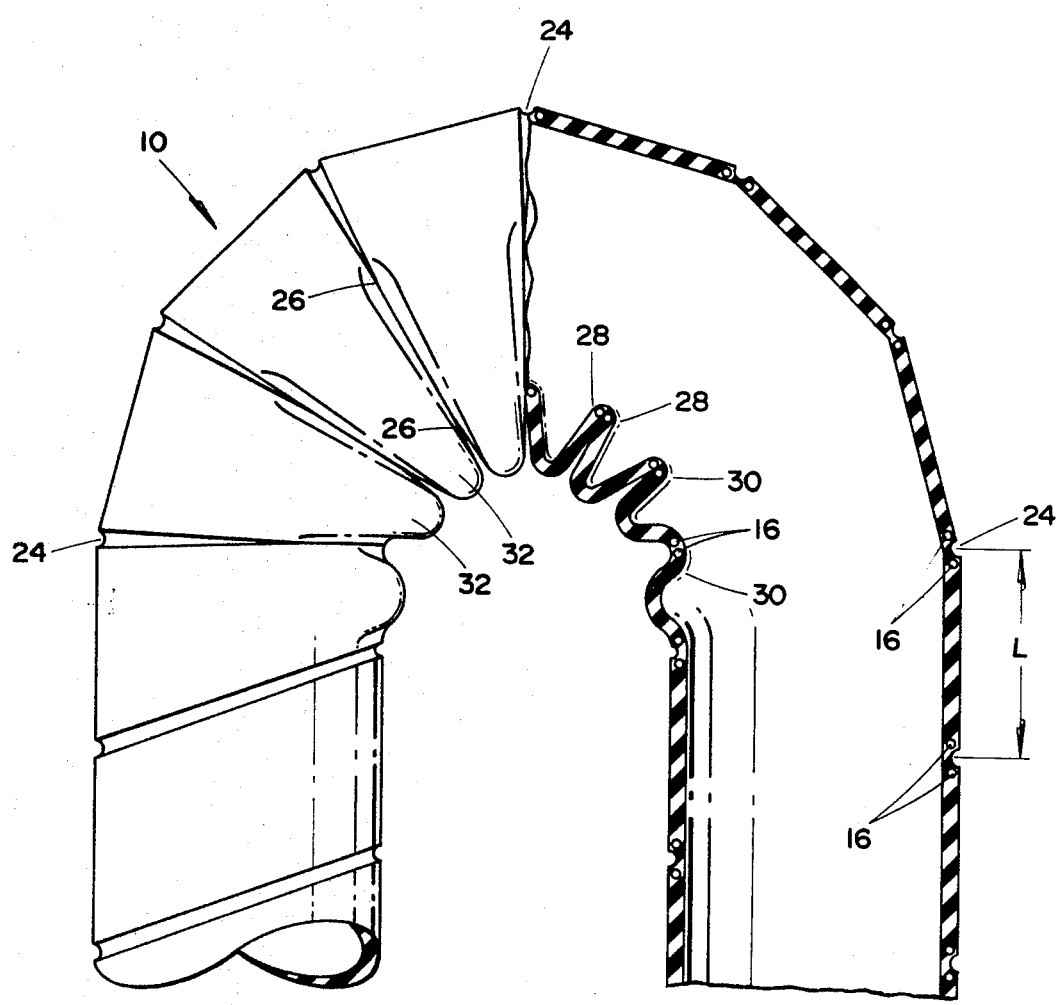
FIG. 3 is a partial cross-sectional side elevation showing the conduit flexed to a minimum bend radius.

The special flexing features of a conduit incorporating my invention is depicted by FIG. 3. When the conduit is flexed to a bend radius of less than one hose diameter, the helical groove 24 collapses 26 and the spiral reinforcement constituting a pair are forced toward each other. Adjacent wires between pairs are then forced toward each other as flexing continues. The adjacent wires form a bend center 28 about which the conduit wall starts folding 30. If the longitudinal spacing L between pairs 16 of wires is too great, the conduit walls have a tendency to fold inwardly, whereas if the longitudinal spacing is too small, the wall section will not form a completed fold. Controlled folding of the wall sections between adjacent pairs permit a large diameter conduit to be flexed to a small bend radius without damaging or kinking the conduit. As mentioned previously, controlled folding of the conduit wall sections is primarily influenced by the longitudinal spacing L between pairs of reinforcements. A suitable reinforcement spacing may be chosen between the range of .6 and 1.1 of the square root of the spiral diameter of the reinforcements ($.6 \sqrt{D_s}$ to $1.1 \sqrt{D_s}$). Conduit constructed with spiral reinforcement spacing L near the $.6 \sqrt{D_s}$ limit is characteristically stiffer than conduit constructed with spiral reinforcement spacing near the $1.1 \sqrt{D_s}$ limit. The effect of spiral reinforcement spacing on conduit stiffness is additional to any effect resulting from the modulus of the chosen elastomeric.

As shown in FIG. 3, the folded wall sections form pseudo convolutions 32 in the area of the bend but the inside diameter of the conduit remains virtually undisturbed to permit uninterrupted conveyance of materials through the conduit.

I claim:

1. A flexible conduit comprising:
   an elastomeric tube having a substantially straight inner wall, and an outer wall having at least one helical groove; and
   at least one pair of spiraled reinforcements establishing a spiral diameter and a longitudinal spacing, reinforcements of a pair located adjacent each side of the helical groove and disposed within said elastomeric tube, the longitudinal spacing between a pair of spiraled reinforcements being between .6 and 1.1 of the square root of the spiral diameter, and the spacing between reinforcements of a pair being less than the longitudinal spacing between a pair of spiraled reinforcements.

2. A flexible conduit according to claim 1 in which the longitudinal spacing between a pair of spiraled reinforcements is essentially .9 of the square root of the spiral diameter.

3. A flexible conduit comprising:
   an elastomeric tube having a substantially straight inner wall and an outer wall having at least one helical groove;
   a reinforcement matrix including at least two layers of fabric having cords, said fabrics disposed within said elastomeric tube so the cords of each said fabric are arranged in opposing spirals throughout said elastomeric tube; and
   at least one pair of spiraled reinforcements establishing a spiral diameter and a longitudinal spacing, reinforcements of said pair located adjacent each side of the helical groove and disposed between said fabric layers, the longitudinal spacing between a pair of spiraled reinforcements being between .6 and 1.1 the square root of the spiral diameter, and the spacing between reinforcements of a pair being less than the longitudinal spacing between a pair of spiraled reinforcements.

4. A flexible conduit according to claim 3 in which the longitudinal spacing between a pair of spiraled reinforcements is essentially .9 of the square root of the spiral diameter.

5. A flexible conduit according to claim 3 wherein the cords of said fabric form a helical angle of essentially 45° throughout said conduit 6. A flexible conduit comprising:
   an elastomeric tube having a substantially straight inner wall and an outer wall having at least one helical groove;
   a reinforcement matrix including at least two layers of fabric having a grid, said fabrics disposed within said elastomeric tubes so the grid of each said fabric is arranged in opposing spirals throughout said elastomeric tube; and
   at least one pair of spiraled reinforcements establishing a spiral diameter and a longitudinal spacing, reinforcements of said pair located adjacent each side of the helical groove and disposed between said fabric layers, the longitudinal spacing between a pair of spiraled reinforcements being between .6 and 1.1 the square root of the spiral diameter, and the spacing between reinforcements of a pair being less than the longitudinal spacing between a pair of spiraled reinforcements.